US012755496B2

(12) United States Patent
Qian et al.

(10) Patent No.: US 12,755,496 B2
(45) Date of Patent: Oct. 6, 2026

(54) DISTANCE CALIBRATION IN AUGMENTED REALITY DISPLAY

(71) Applicant: Medivis, Inc., New York, NY (US)

(72) Inventors: Long Qian, Brooklyn, NY (US); Osamah Choudhry, New York, NY (US); Christopher Morley, New York, NY (US)

(73) Assignee: Medivis, Inc., New York, NY (US)

( * ) Notice: Subject to any disclaimer, the term of this patent is extended or adjusted under 35 U.S.C. 154(b) by 121 days.

(21) Appl. No.: 18/802,122

(22) Filed: Aug. 13, 2024

(65) Prior Publication Data

US 2024/0412470 A1 Dec. 12, 2024

Related U.S. Application Data

(63) Continuation-in-part of application No. 18/380,076, filed on Oct. 13, 2023, now Pat. No. 12,462,496, and a continuation-in-part of application No. 18/244,138, filed on Sep. 8, 2023, now Pat. No. 12,456,267, and a continuation-in-part of application No. 18/208,136, filed on Jun. 9, 2023, now Pat. No. 12,551,283.

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | | | |
|---|---|---|---|---|
| 2017/0105713 | A1* | 4/2017 | Frimer | A61B 1/3132 |
| 2023/0240759 | A1* | 8/2023 | Khare | A61B 34/20<br>606/1 |
| 2023/0352133 | A1* | 11/2023 | Chen | G16H 30/20 |

* cited by examiner

*Primary Examiner* — Nicholas R Wilson
(74) *Attorney, Agent, or Firm* — Cognition IP, P.C.; Edward Steakley; Saleh Kaihani

(57) ABSTRACT

Various embodiments of an apparatus, methods, systems and computer program products described herein are directed to a Calibration Engine for detecting first coordinates for a first physical instrument that correspond to poses of the first physical instrument in a unified three-dimensional (3D) coordinate space. The Calibration Engine detects second coordinates for a second physical instrument that correspond to poses of the second physical instrument in the unified 3D coordinate space. Based on the detected first and second coordinates, the Calibration Engine determines a distance from a tip of the first physical instrument to a predefined calibration location of the second physical instrument.

20 Claims, 8 Drawing Sheets

600

DISTANCE CALIBRATION IN AUGMENTED REALITY DISPLAY

CROSS REFERENCE TO RELATED APPLICATIONS

This application is a continuation-in-part of U.S. patent application Ser. No. 18/244,138 entitled AUTOMATIC REGISTRATION OF LANDMARKS FOR AUGMENTED REALITY ASSISTED SURGERY filed on Sep. 8, 2023, the entirety of which is incorporated by reference.

This application is a continuation-in-part of U.S. patent application Ser. No. 18/208,136 entitled SURGICAL NAVIGATION TRAJECTORY IN AUGMENTED REALITY DISPLAY filed on Jun. 9, 2023, the entirety of which is incorporated by reference.

This application is a continuation-in-part of U.S. patent application Ser. No. 18/380,076 entitled DETACHED VISUALIZATION FOR SURGICAL NAVIGATION IN MIXED REALITY filed on Oct. 13, 2023, the entirety of which is incorporated by reference.

BACKGROUND

Current conventional systems have limitations with regard to two-dimensional (2D) and three-dimensional (3D) images in surgical settings. Surgical planning and surgical navigation are necessary for every medical procedure. A surgeon and their team must have a plan for a case before entering an operating room, not just as a matter of good practice but to minimize malpractice liabilities and to enhance patient outcomes. Surgical planning is often conducted based on medical images including DICOM scans (MRI, CT, etc.), requiring the surgeon to flip through numerous views/slices, and utilizing this information to imagine a 3D model of the patient so that the procedure may be planned. Accordingly, in such a scenario, the best course of action is often a surgeon's judgment call based on the data that they are provided.

SUMMARY

Various embodiments of an apparatus, methods, systems and computer program products described herein are directed to a Calibration Engine for detecting first coordinates for a first physical instrument that correspond to poses of the first physical instrument in a unified three-dimensional (3D) coordinate space. The Calibration Engine detects second coordinates for a second physical instrument that correspond to poses of the second physical instrument in the unified 3D coordinate space. Based on the detected first and second coordinates, the Calibration Engine determines a distance from a tip of the first physical instrument to a predefined calibration location of the second physical instrument.

In some embodiments, the Calibration Engine detects the first and the second coordinates occurs during a predefined range of time.

In one or more embodiments, the Calibration Engine concurrently detects the first and the second coordinates.

According to various embodiments, the Calibration Engine detects the first and the second coordinates occurs during a predefined range of time.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
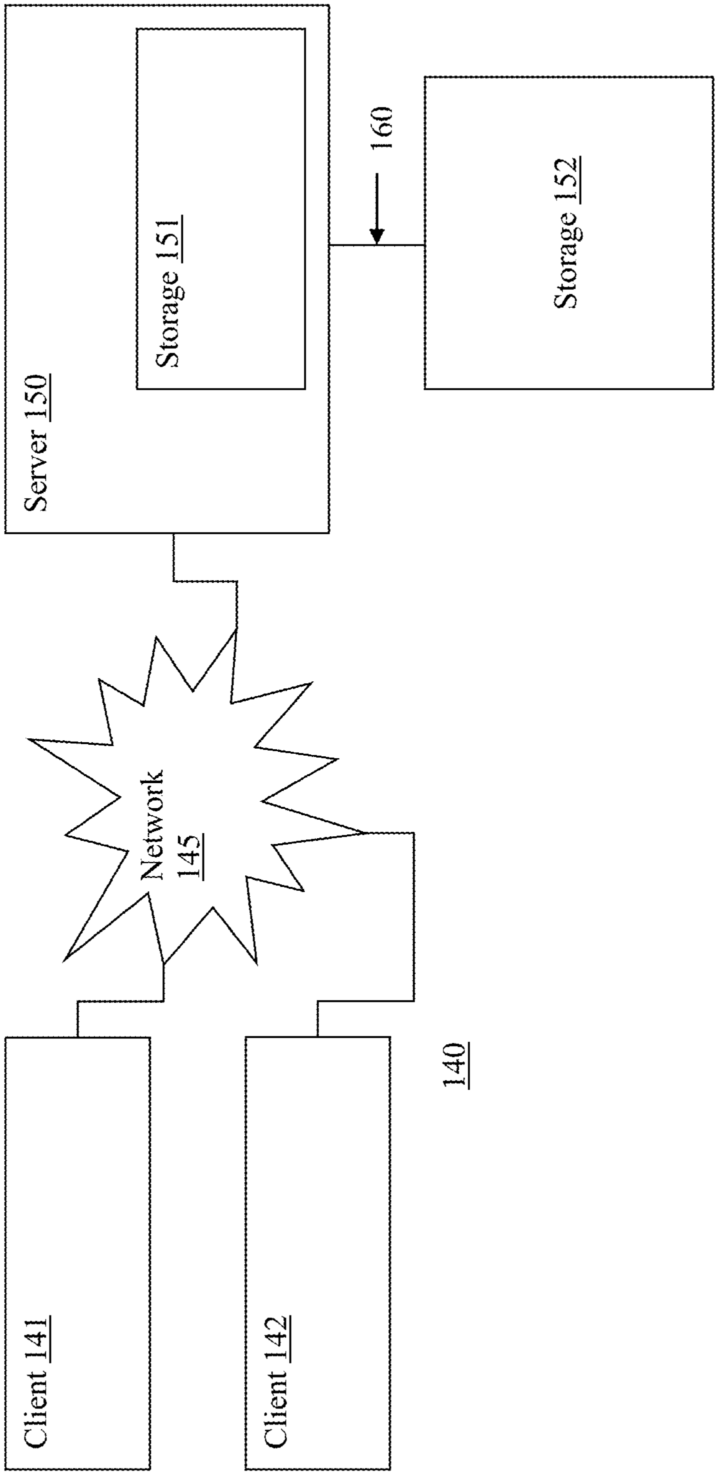
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
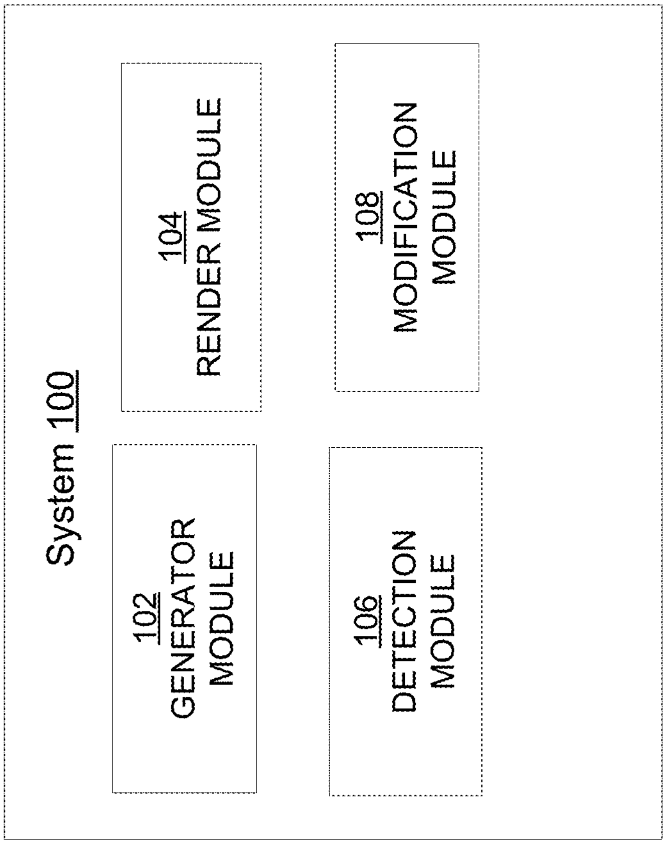
FIG. 1B is a diagram illustrating an exemplary environment in which some embodiments may operate.

FIG. 1B illustrates a block diagram of an example system 100 for a Calibration Engine that includes one or more modules. The system 100 may communicate with a user device 140 to display output, via a user interface 144 generated by an application engine. In various embodiments, the user device 140 may be an AR display headset device that further includes one or more of the respective modules 102, 104, 106 and 108.

Module 102 of the system 100 may perform functionality, steps, operations, commands and/or instructions as illustrated in one or more of FIGS. 2, 3, 4, 5, 6 (hereinafter "FIGS. 2-6").

Module 104 of the system 100 may perform functionality, steps, operations, commands and/or instructions as illustrated in one or more of FIGS. 2-6.

Module 106 of the system 100 may perform functionality, steps, operations, commands and/or instructions as illustrated in one or more of FIGS. 2-6.

Module 108 of the system 100 may perform functionality, steps, operations, commands and/or instructions as illustrated in one or more of FIGS. 2-6.

A database associated with the system 100 maintains information, such as 3D medical model data, in a manner the promotes retrieval and storage efficiency and/or data security. In addition, the model data may include rendering parameters, such as data based on selections and modifications to a 3D virtual representation of a medical model rendered for a previous Augmented Reality display. In various embodiments, one or more rendering parameters may be preloaded as a default value for a rendering parameter in a newly initiated session of the Calibration Engine.

In various embodiments, the Calibration Engine accesses one or more storage locations that contain respective portions of medical model data. The medical model data may be represented according to two-dimensional (2D) and three-dimensional (3D) medical model data. The 2D and/or 3D ("2D/3D") medical model data 124 may include a plurality of slice layers of medical data associated with external and internal anatomies. For example, the 2D/3D medical model data 124 may include a plurality of slice layers of medical data for generating renderings of external and internal anatomical regions of a user's head, brain and skull. It is understood that various embodiments may be directed to generating displays of any internal or external anatomical portions of the human body and/or animal bodies. In some embodiments, 2D/3D medical model data may be accessible and portrayed via a 3D cloud point representation of an anatomical region. The medical model data 124 may further be based on medical scan data.

It is understood that embodiments of the Calibration Engine described herein are not limited to the facial area or a head region. That is, the target portion of physical anatomy may be any anatomical portion, for example, such as a hand, leg, torso, and/or shoulder. The corresponding machine learning algorithms thereby may be, respectively, a hand landmark detection algorithm, a leg landmark detection algorithm, a torso landmark detection algorithm and/or a shoulder landmark detection algorithm.

Various embodiments described herein provide functionality for selection of menu functionalities and positional display coordinates. For example, the Calibration Engine tracks one or more physical gestures such as movement of a user's hand(s) and/or movement of a physical instrument(s) via one or more tracking algorithms to determine directional data to further be utilized in determining whether one or more performed physical gestures indicate a selection of one or more types of functionalities accessible via the AR display and/or selection and execution of a virtual interaction(s). For example, the Calibration Engine may track movement of the user's hand that results in movement of a physical instrument and/or one or more virtual offsets and virtual objects associated with the physical instrument. The Calibration Engine may determine respective positions and changing positions of one or more hand joints or one or more portions of the physical instrument. In various embodiments, the Calibration Engine may implement a simultaneous localization and mapping (SLAM) algorithm.

The Calibration Engine may generate directional data based at least in part on average distances between the user's palm and the user's fingers and/or hand joints or distances between portions (physical portions and/or virtual portions) of a physical instrument. In some embodiments, the Calibration Engine generates directional data based on detected directional movement of the AR headset device worn by the user. The Calibration Engine determines that the directional data is based on a position and orientation of the user's hand(s) (or the physical instrument) that indicates a portion (s) of a 3D virtual object with which the user seeks to select and/or virtually interact with and/or manipulate.

According to various embodiments, the Calibration Engine may implement a collision algorithm to determine a portion of a virtual object the user seeks to select and/or virtually interact with. For example, the Calibration Engine may track the user's hands and/or the physical instrument according to respective positional coordinates in the unified 3D coordinate system that correspond to the orientation of the user's hands and/or the physical instrument in the physical world. The Calibration Engine may detect that one or more tracked positional coordinates may overlap (or be the same as) one or more positional coordinates for displaying a particular portion(s) of a virtual object. In response to detecting the overlap (or intersection), the Calibration Engine determines that the user seeks to select and/or virtually interact with the portion(s) of the particular virtual object displayed at the overlapping positional coordinates.

According to various embodiments, upon determining the user seeks to select and/or virtually interact with a virtual object, the Calibration Engine may detect one or more changes in hand joint positions and/or physical instrument positions and identify the occurrence of the position changes as a performed selection function. For example, a performed selection function may represent an input command to the Calibration Engine confirming the user is selecting a portion of a virtual object via a ray casting algorithm and/or collision algorithm. For example, the performed selection function may also represent an input command to the Calibration Engine confirming the user is selecting a particular type of virtual interaction functionality. For example, the user may perform a physical gesture of tips of two fingers touching to correspond to a virtual interaction representing an input command, such as a select input command.

The Calibration Engine identifies one or more virtual interactions associated with the detected physical gestures. In various embodiments, the Calibration Engine identifies a virtual interaction selected by the user, or to be performed by the user, based on selection of one or more functionalities from a 3D virtual menu displayed in the AR display. In addition, the Calibration Engine identifies a virtual interaction selected by the user according to one or more predefined gestures that represent input commands for the Calibration Engine. In some embodiments, a particular virtual interaction may be identified based on a sequence of performed physical gestures detected by the Calibration Engine. In some embodiments, a particular virtual interaction may be identified as being selected by the user based on a series of preceding virtual interactions.

Figure 2:
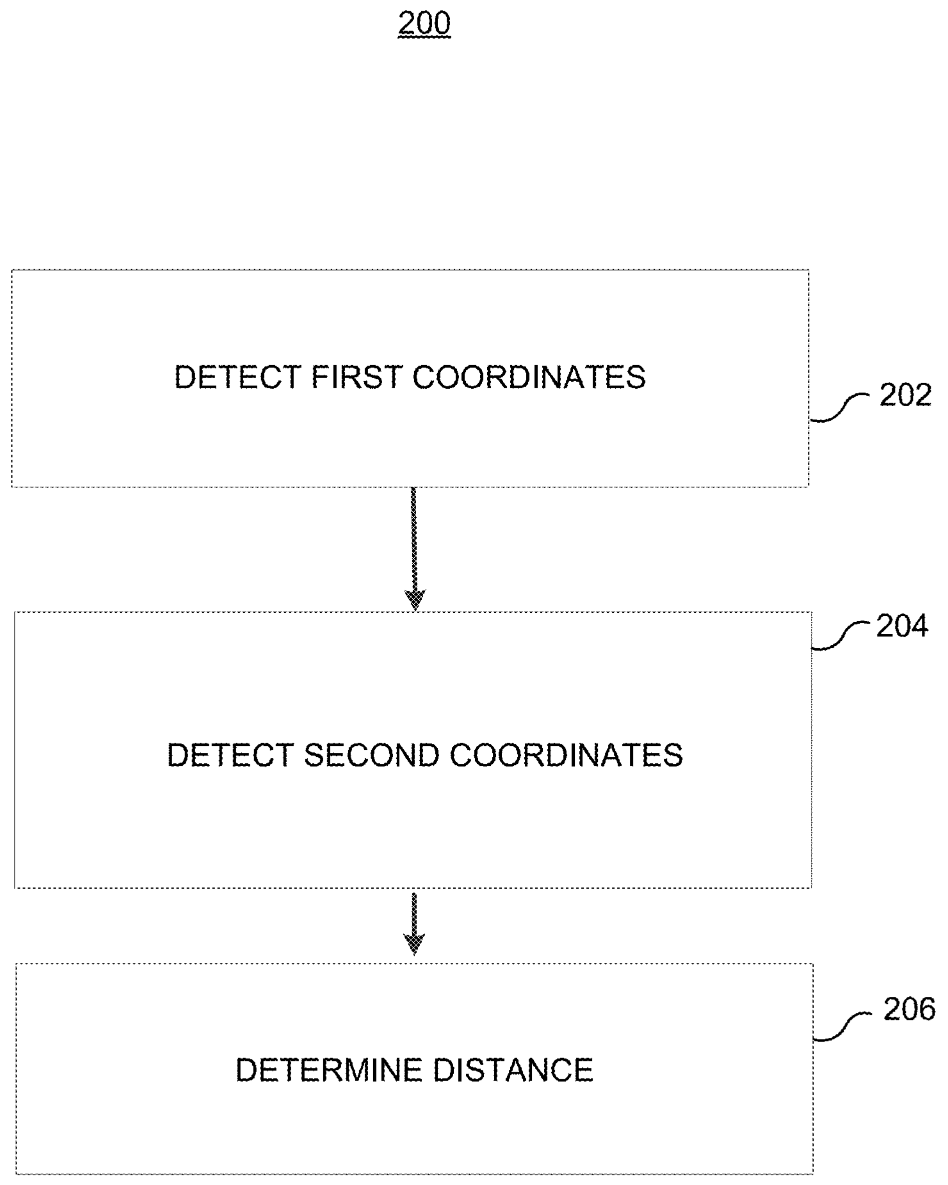
FIG. 2 is a diagram illustrating an exemplary method that may be performed in some embodiments.

As shown in an example flowchart 200 of FIG. 2, at step 202, the Calibration Engine detects first coordinates for a first physical instrument that correspond to at least one pose of the first physical instrument in a unified three-dimensional (3D) coordinate space.

At step 204, the Calibration Engine detects second coordinates for a second physical instrument that correspond to at least one pose of the second physical instrument in a unified 3D coordinate space.

At step 206, based on the detected first and second coordinates, the Calibration Engine determines a distance from a tip of the first physical instrument to a predefined calibration location of the second physical instrument.

Figure 3:
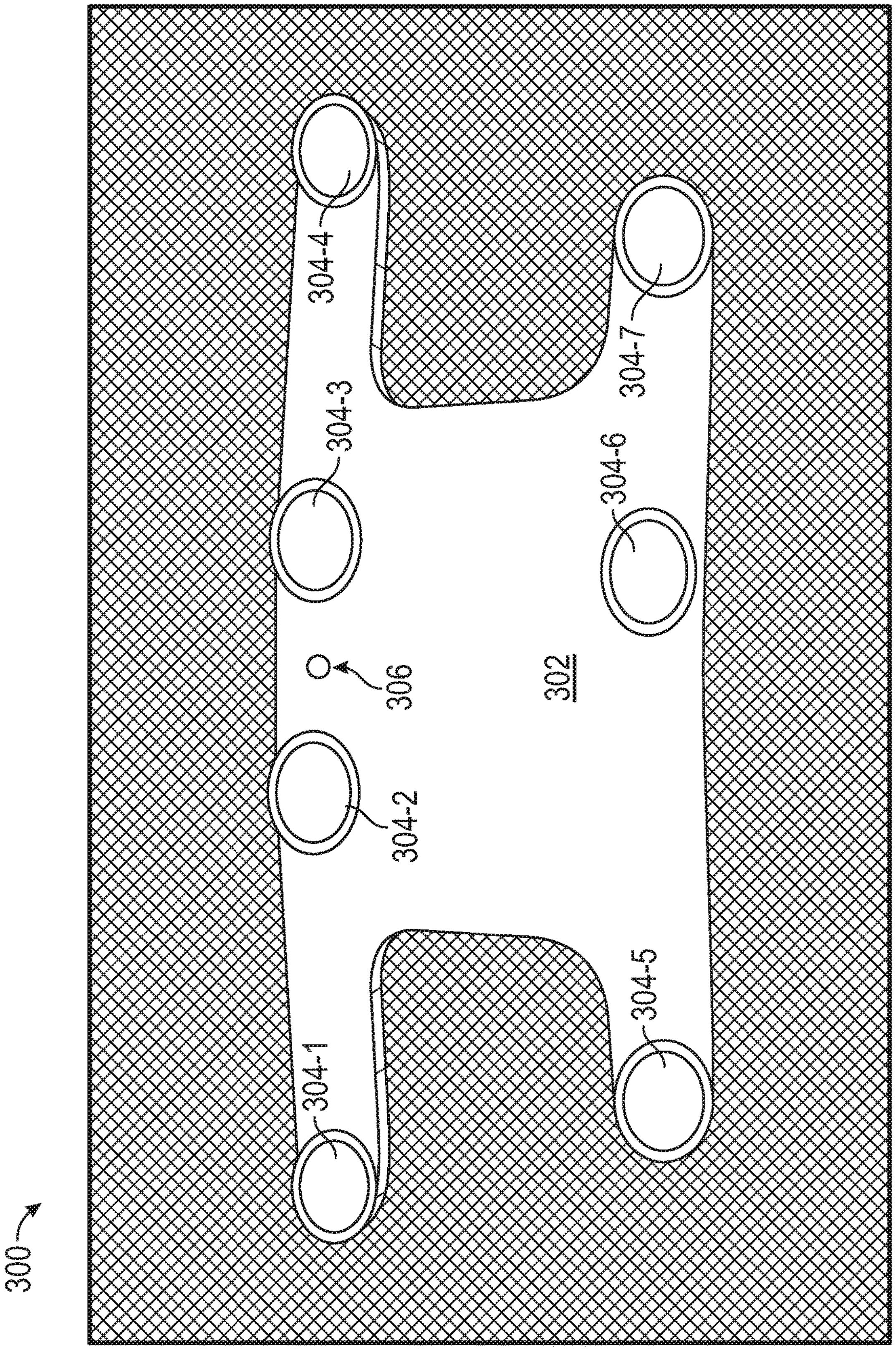
FIG. 3 is a diagram illustrating an exemplary environment in which some embodiments may operate.

As shown in FIG. 3, various embodiments include a physical instrument 302 that may have one or more reference markers 304-1, 304-2, 304-3, 304-4, 304-5, 304-6, 304-7 ("304"). The reference markers may be fiducial markers in various embodiments. The Calibration Engine tracks the reference markers 304 via the headset. As the reference markers are tracked, the Calibration Engine determines coordinates for each of the reference markers 304 in the 3D coordinate space.

The instrument 302 further includes a predefined calibration location 306. In some embodiments, the calibration location 306 may be a divot on the surface of the instrument 302. The calibration location 306 has a predefined placement on the surface of the instrument 302 such that fixed distances between the calibration location 306 and one or more of the reference markers 304 are known. In some examples, the calibration location 306 may be formed on the surface of the instrument 302 so as to be compatible with a portion of a catheter or any other medical instrument.

Figure 4:
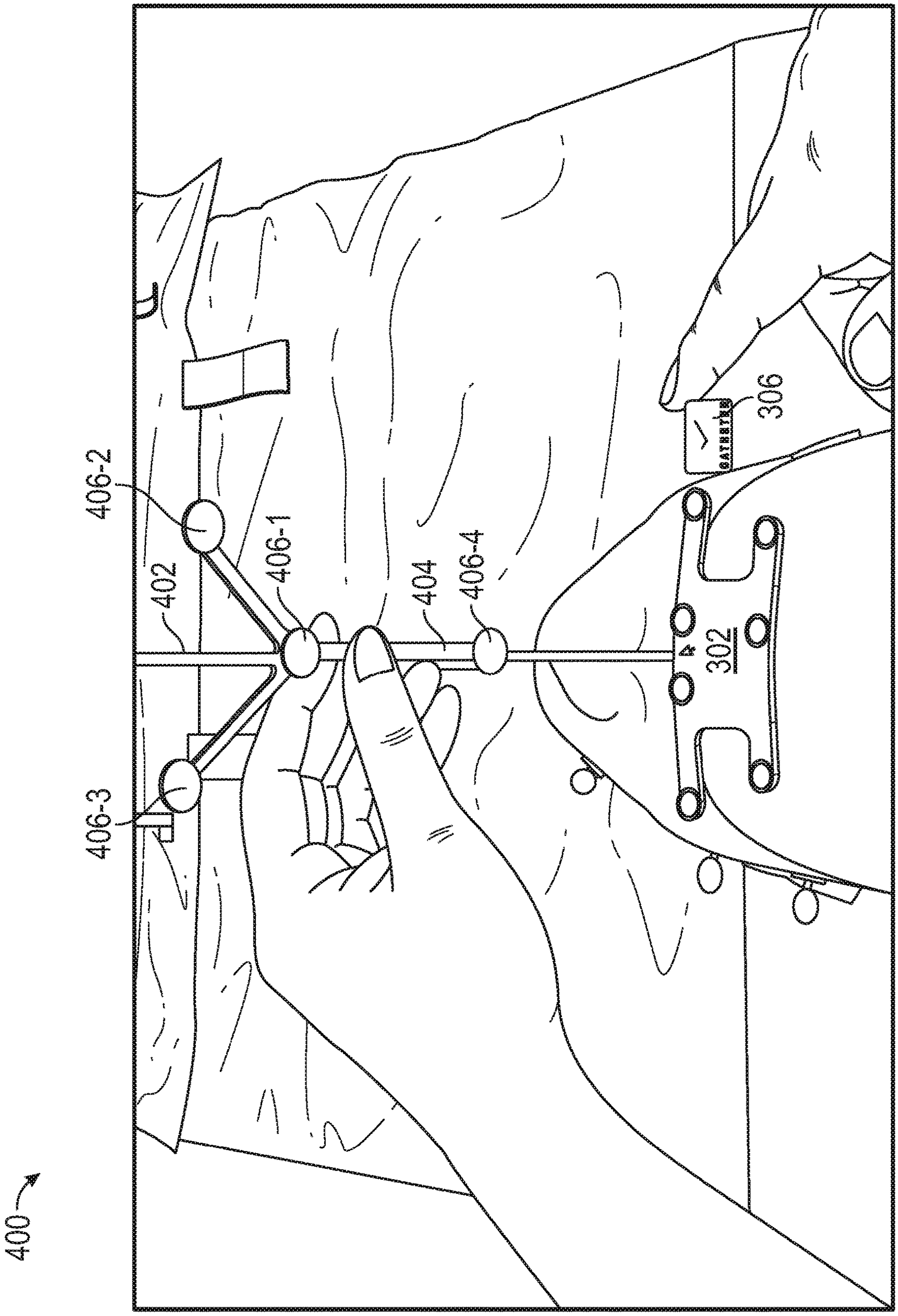
FIG. 4 is a diagram illustrating an exemplary environment in which some embodiments may operate.

As shown in FIG. 4, various embodiments include a physical instrument 404 that may have one or more reference markers 406-1, 406-2, 406-3, 406-4 ("406"). The reference markers 406 may be fiducial markers in various embodiments. The Calibration Engine tracks the reference markers 406 via the headset in a similar manner as other reference markers 304. In addition, there may be predefined fixed distances between the markers 406.

The instrument 404 includes a surface for attachment onto a medical instrument. For example, the instrument 404 may include a surface that allows a user to physically attach the instrument 404 onto a portion of a catheter 402 or a portion of any other type of medical instrument.

In some embodiments, the instrument 404 may clip onto portion of a catheter 402. Once the instrument 404 is temporarily attached to the catheter 402, the user may physically manipulate the instrument 404 in order to further handle and manipulate the catheter 402. The user may guide the instrument 404 into a particular position and orientation that results in a portion of the catheter 402 being placed upon the calibration location 306. For example, where the calibration location 306 is a divot, may guide the instrument 404 so that a terminus of the catheter 402 is placed within the divot. By doing so, the predefined placement of the calibration location 306 is also a current placement of the terminus of the catheter 402.

Upon determining that the terminus of the catheter 402 is securely placed at the calibration location 306, the Calibration Engine may receive an indication of a selection of a virtual object 306 displayed in an Augmented Reality (AR) display associated with the AR headset. For example, selection of the virtual object 306 may represent a user request to initiate a calibration interaction.

Figure 5:
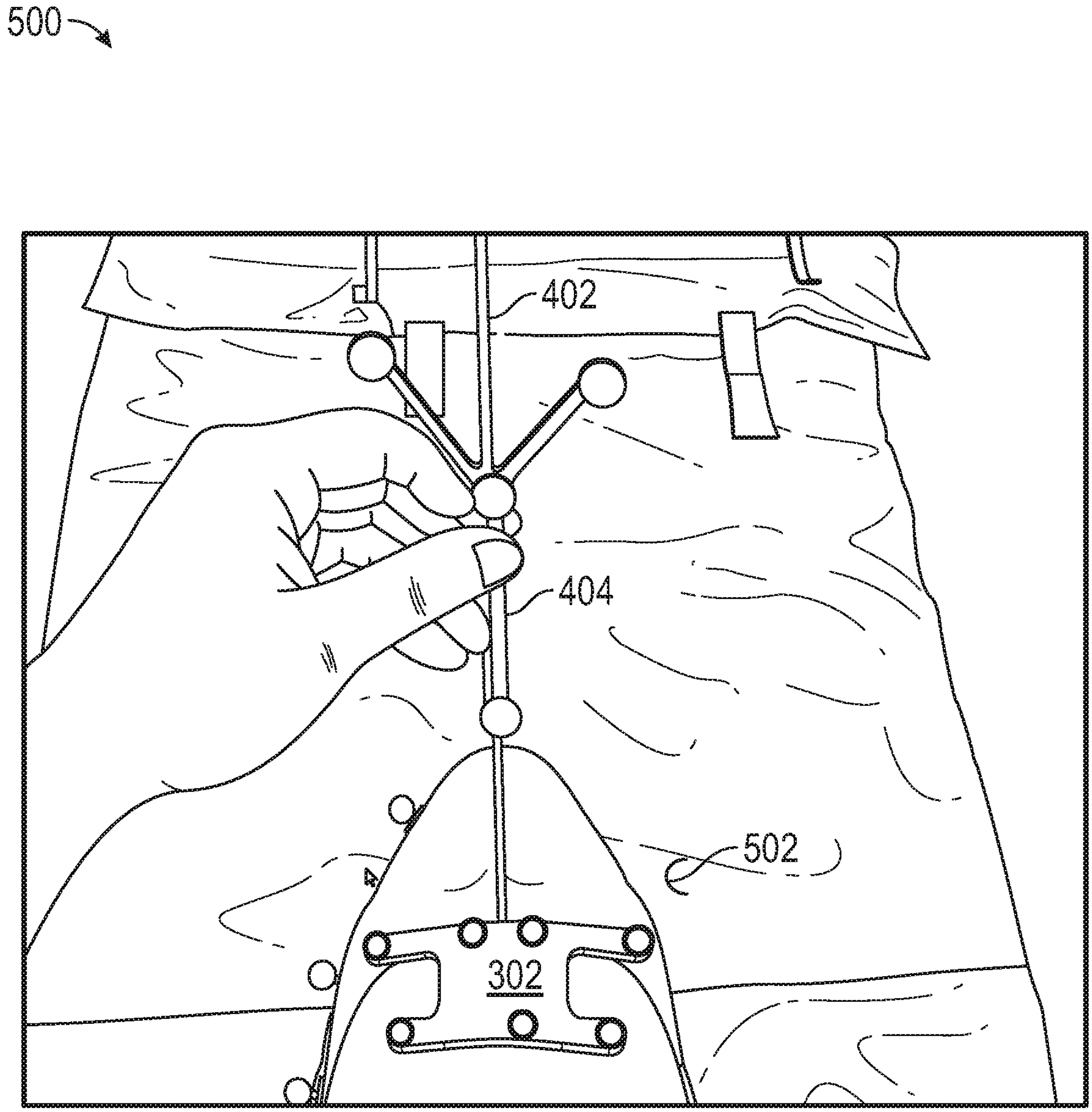
FIG. 5 is a diagram illustrating an exemplary environment in which some embodiments may operate.

As shown in FIG. 5, based on receipt of the request to initiation a calibration interaction, the Calibration Engine displays a virtual visual cue 502 in the AR display. Display of the visual cue 502 by the Calibration Engine represents that calibration processing is underway.

The Calibration Engine performs various operations for the calibration processing. In various embodiments, the Calibration Engine detects the coordinates, in the unified 3D coordinate space, for each of the reference markers 304, 406 on both instruments 302, 404. For example, the Calibration Engine concurrently detects successive coordinates for each reference marker 304, 406 during a predefined time range. The Calibration Engine thereby detects multiple coordinate values for each reference marker 304, 406 over time during the entirety of the predefined time range.

Once the predefined time range expires, the Calibration Engine calculates the average coordinates for each reference marker 304, 406. Given that a certain fixed distance is associated with each reference marker 304, 406, the Calibration Engine utilizes the calculated average coordinates for each reference marker 304, 406 to determine the average position and orientation of each instrument 302, 404. For example, there may be known and predefined fixed distances among reference markers 304, 406. There may also be a predefined fixed distance between the calibration location 306 and the one or more reference markers 304.

The Calibration Engine applies a transformation metric based on the calculated average coordinates for each reference marker 304, 406 and associated fixed distances determine an average position and orientation of both instruments 302, 404. The Calibration Engine thereby determines a placement, in the unified 3D coordinate space, of a terminus of a portion of an instrument 404 and the calibration location 306. For example, a terminus of the instrument 404 may be where a particular reference marker 406-4 is situated on the instrument 404. Based on the these placements, the Calibration Engine calculates a distance between the terminus of the portion of an instrument 404 and the calibration location 306. The calculated distance thereby represents a distance by which a portion of the catheter current extends away from the terminus of the portion of an instrument 404.

Figure 6:
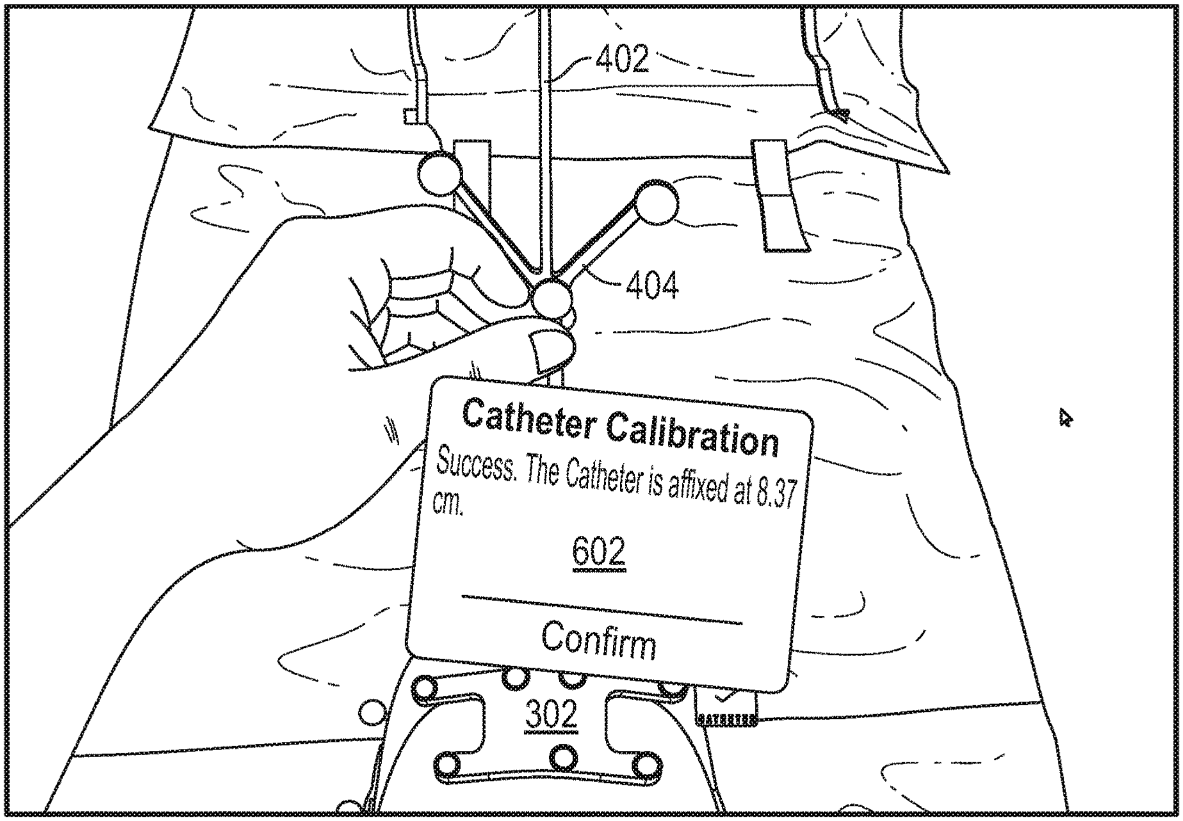
FIG. 6 is a diagram illustrating an exemplary environment in which some embodiments may operate.

As shown in FIG. 6, at the end of the predefined time range, the Calibration Engine displays a prompt virtual object 602 in the AR display. Display of the prompt virtual object 602 may include display of the distance by which the portion of the catheter current extends away from the terminus of the portion of an instrument 404

Figure 7:
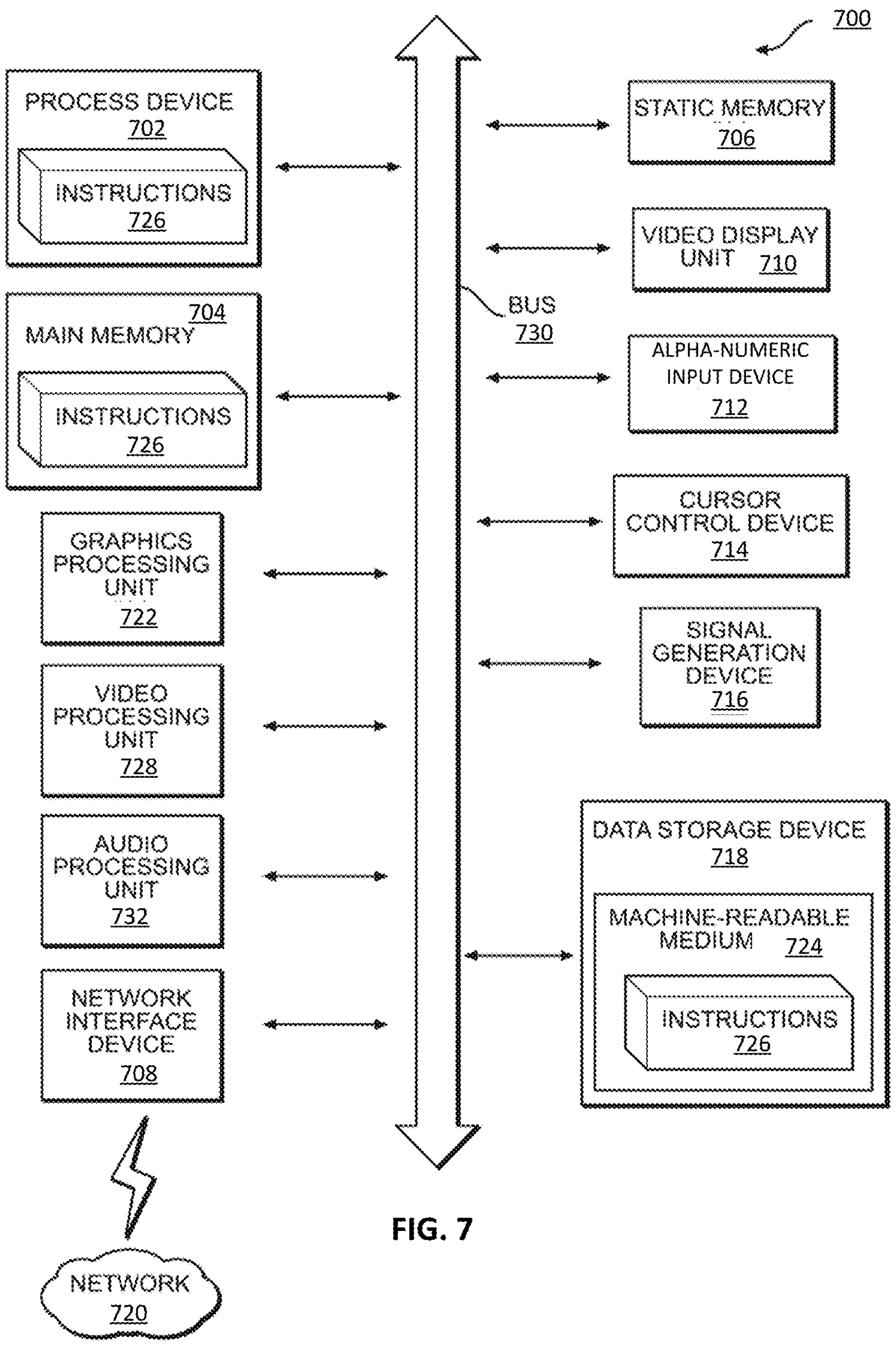
FIG. 7 is a diagram illustrating an exemplary environment in which some embodiments may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:

detecting first coordinates for a first physical instrument that correspond to at least one pose of the first physical instrument in a unified three-dimensional (3D) coordinate space, wherein the first physical instrument comprises one or more first instrument reference markers, wherein distances between the calibration location and the first instrument reference markers are fixed;

detecting the first coordinates by tracking the first instrument reference markers, via an augmented reality (AR) headset, wherein tracking comprises determining coordinates of the first instrument reference markers in the unified 3D coordinate space, wherein the first physical instrument comprises a surface for attachment of the first physical instrument to a medical instrument;

detecting second coordinates for a second physical instrument that correspond to at least one pose of the second physical instrument in the unified 3D coordinate space, wherein the second physical instrument comprises second instrument reference markers, wherein the second physical instrument further comprises a calibration location on the surface of the second physical instrument, compatible with a portion of the medical instrument, wherein distances between the second instrument reference markers and the calibration location are fixed;

detecting the second coordinates by tracking the second instrument reference markers and the calibration location, via the AR headset;

based on the detected first and second coordinates, determining a terminus distance from a terminus of the first physical instrument to the calibration location of the second physical instrument; and based on the terminus distance, displaying in the AR headset a visual comprising the distance the medical instrument extends away from the terminus of the first physical instrument.

2. The computer-implemented method of claim 1, wherein the detecting the first and the second coordinates occurs during a predefined range of time.

3. The computer-implemented method of claim 2, further comprising:

initiating the predefined range of time in response to a request.

4. The computer-implemented method of claim 1, wherein the detecting the first and the second coordinates occurs concurrently.

5. The computer-implemented method of claim 1, wherein the detecting the first and the second coordinates comprises:

detecting a first set of coordinates that correspond to successive poses of the first physical instrument; and detecting a second set of coordinates that correspond to successive poses of the second physical instrument.

6. The computer-implemented method of claim 5, wherein the first and the second coordinates respectively comprise:

coordinates of reference markers located on each of the first and the second physical instruments.

7. The computer-implemented method of claim 6, wherein the reference markers located on the second physical instrument are located at respective different locations than the calibration location.

8. A system comprising one or more processors, and a non-transitory computer-readable medium including one or more sequences of instructions that, when executed by the one or more processors, cause the system to perform operations comprising:

detecting first coordinates for a first physical instrument that correspond to at least one pose of the first physical instrument in a unified three-dimensional (3D) coordinate space, wherein the first physical instrument comprises one or more first instrument reference markers, wherein distances between the calibration location and the first instrument reference markers are fixed;

detecting the first coordinates by tracking the first instrument reference markers, via an augmented reality (AR) headset, wherein tracking comprises determining coordinates of the first instrument reference markers in the unified 3D coordinate space, wherein the first physical instrument comprises a surface for attachment of the first physical instrument to a medical instrument;

detecting second coordinates for a second physical instrument that correspond to at least one pose of the second physical instrument in the unified 3D coordinate space, wherein the second physical instrument comprises second instrument reference markers, wherein the second physical instrument further comprises a calibration location on the surface of the second physical instrument, compatible with a portion of the medical instrument, wherein distances between the second instrument reference markers and the calibration location are fixed;

detecting the second coordinates by tracking the second instrument reference markers and the calibration location, via the AR headset;

based on the detected first and second coordinates, determining a terminus distance from a terminus of the first physical instrument to the calibration location of the second physical instrument; and based on the terminus distance, displaying in the AR headset a visual comprising the distance the medical instrument extends away from the terminus of the first physical instrument.

9. The system of claim 8, wherein the detecting the first and the second coordinates occurs during a predefined range of time.

10. The system of claim 9, further comprising: initiating the predefined range of time in response to a request.

11. The system of claim 8, wherein the detecting the first and the second coordinates occurs concurrently.

12. The system of claim 8, wherein the detecting the first and the second coordinates comprises:

detecting a first set of coordinates that correspond to successive poses of the first physical instrument; and detecting a second set of coordinates that correspond to successive poses of the second physical instrument.

13. The system of claim 12, wherein the first and the second coordinates respectively comprise:

coordinates of reference markers located on each of the first and the second physical instruments.

14. The system of claim 13, wherein the reference markers located on the second physical instrument are located at respective different locations than the calibration location.

15. A computer program product comprising a non-transitory computer-readable medium having a computer-readable program code embodied therein to be executed by one or more processors, the program code including instructions for:

detecting first coordinates for a first physical instrument that correspond to at least one pose of the first physical instrument in a unified three-dimensional (3D) coordinate space, wherein the first physical instrument comprises one or more first instrument reference markers, wherein distances between the calibration location and the first instrument reference markers are fixed;

detecting the first coordinates by tracking the first instrument reference markers, via an augmented reality (AR) headset, wherein tracking comprises determining coordinates of the first instrument reference markers in the unified 3D coordinate space, wherein the first physical instrument comprises a surface for attachment of the first physical instrument to a medical instrument;

detecting second coordinates for a second physical instrument that correspond to at least one pose of the second physical instrument in the unified 3D coordinate space, wherein the second physical instrument comprises second instrument reference markers, wherein the second physical instrument further comprises a calibration location on the surface of the second physical instrument, compatible with a portion of the medical instrument, wherein distances between the second instrument reference markers and the calibration location are fixed;

detecting the second coordinates by tracking the second instrument reference markers and the calibration location, via the AR headset;

based on the detected first and second coordinates, determining a terminus distance from a terminus of the first physical instrument to the calibration location of the second physical instrument; and based on the terminus distance, displaying in the AR headset a visual comprising the distance the medical instrument extends away from the terminus of the first physical instrument.

16. The computer program product of claim 15, wherein the detecting the first and the second coordinates occurs during a predefined range of time.

17. The computer program product of claim 16, further comprising:

initiating the predefined range of time in response to a request.

18. The computer program product of claim 15, wherein the detecting the first and the second coordinates occurs concurrently.

19. The computer program product of claim 15, wherein the detecting the first and the second coordinates comprises:

detecting a first set of coordinates that correspond to successive poses of the first physical instrument; and detecting a second set of coordinates that correspond to successive poses of the second physical instrument.

20. The computer program product of claim 19, wherein the first and the second coordinates respectively comprise:

coordinates of reference markers located on each of the first and the second physical instruments, the reference markers located on the second physical instrument are located a respective different locations than the calibration location.

* * * * *